United States Patent [19]
Yeh

[11] Patent Number: 5,917,473
[45] Date of Patent: Jun. 29, 1999

[54] ENCODER MODULE FOR USE IN CURSOR CONTROL DEVICE

[75] Inventor: Hsin-Chyh Yeh, Taipei Hsien, Taiwan

[73] Assignee: Primax Electronics Ltd., Taipei Hsien, Taiwan

[21] Appl. No.: 08/722,798

[22] Filed: Sep. 27, 1996

[51] Int. Cl.[6] .............................. G09G 5/00; G09F 3/033
[52] U.S. Cl. .......................... 345/163; 345/184; 341/20
[58] Field of Search .................................. 345/156, 157, 345/163–167, 184; 341/35, 20

[56] References Cited

U.S. PATENT DOCUMENTS

| | | | |
|---|---|---|---|
| 4,612,539 | 9/1986 | Hosogoe et al. | 345/164 |
| 4,636,621 | 1/1987 | McGeorge | 345/184 |
| 4,806,917 | 2/1989 | Hosogoe | 345/164 |
| 5,095,303 | 3/1992 | Clark et al. | 345/164 |
| 5,298,919 | 3/1994 | Chang | 345/163 |
| 5,446,481 | 8/1995 | Gillick et al. | 345/163 |
| 5,530,455 | 6/1996 | Gillick et al. | 345/163 |

*Primary Examiner*—Jeffery Brier
*Attorney, Agent, or Firm*—Bacon & Thomas, PLLC

[57] ABSTRACT

An encoder module for use in a three-dimensional cursor control device adapted for encoding process is disclosed. The encoder module of the present invention comprises a positioning base having a pair of corresponding positioning members, a signal generating device mounted between the pair of corresponding positioning members for generating encoding signals, the signal generating device includes a rotating member having a central portion and having an electrical contact on its surface, an axis reeving through the central portion of the rotating member for positioning the rotating member between the pair of corresponding positioning members, and a plate connected with the axis and having a plurality of electrical brushes on its surface. Wherein the electrical contact is intermittently engaged with the electrical brushes by rotating the rotating member.

3 Claims, 4 Drawing Sheets

ENCODER MODULE FOR USE IN CURSOR CONTROL DEVICE

BACKGROUND OF THE INVENTION

1. Field of the Invention

The present invention relates to an encoder module, and more particularly, to an encoder module adapted to be used in a three-dimensional cursor control device.

2. Description of the Prior Art

Cursor control device is one of commonly used computer peripherials under Windows based operation system. Cursor control devices with different structures have been provided in the market, e.g. computer mice, trackballs, touch pad is digitizers and joysticks, depending on different types of the Windows based operation system, to comply with needs of various software applications' cursor control. And obviously, the structures of different cursor control devices for generating cursor control signals will differ from each other.

Taking computer mouse for example, the most well-known computer mouse is a two-dimensional type. Its operation theory for cursor control is rotate two sets of encoder wheels by frictioning a ball to intermittently mask the light emitted by a pair of light sources to generate the effect of close/open of lights. Voltage signals are generated after the lights penetrates through the encoder wheels and are respectively received by a pair of photodetectors. Signals for controlling cursor movements are generated by processing the voltage signals.

Two-dimensional computer mice are not applicable in some way due to the gradual increase of software applications. Therefore, three-or even more dimensional computer mice are invented and produced in the market. Consequently, how to simply and make more convenient the manipulation of the cursor control signal generating mechanism for three-dimensional computer mice will thus become the major subject.

SUMMARY OF THE INVENTION

It is therefore a primary object of the present invention to provide a simplified encoder module of a cursor control device which can be used for encoding purpose in a three-dimensional computer mouse.

Briefly, in a preferred embodiment, the present invention comprises:

(1) a positioning base having a pair of corresponding positioning members; and (2) a signal generating means mounted between the pair of corresponding positioning members for generating encoding signals, including:

a rotating member having a central portion and having an electrical contact on its surface;

an axis reeving through the central portion of the rotating member for positioning the rotating member between the pair of corresponding positioning members; and a plate connected with the axis and having a plurality of electrical brushes on its surface;

Wherein the electrical contact is intermittently engaged with the electrical brushes by rotating the rotating member.

In accordance with one aspect of the present invention, the encoder module further comprises an annular member connected to the axis for being an operating interface to rotate the rotating member. And the signal generating means further includes a switch member installed on the plate adjacent to the annular member, and a pair of elastic pieces respectively provided on each positioning member and one surface of each elastic piece contacting with the axis respectively.

These and other objects and the advantages of the present invention will no doubt become obvious to those of ordinary skill in the art after having read the following detailed description of the preferred embodiment which is illustrated in the various figures and drawings.

DETAILED DESCRIPTION OF THE PREFERRED EMBODIMENT

Figure 1:
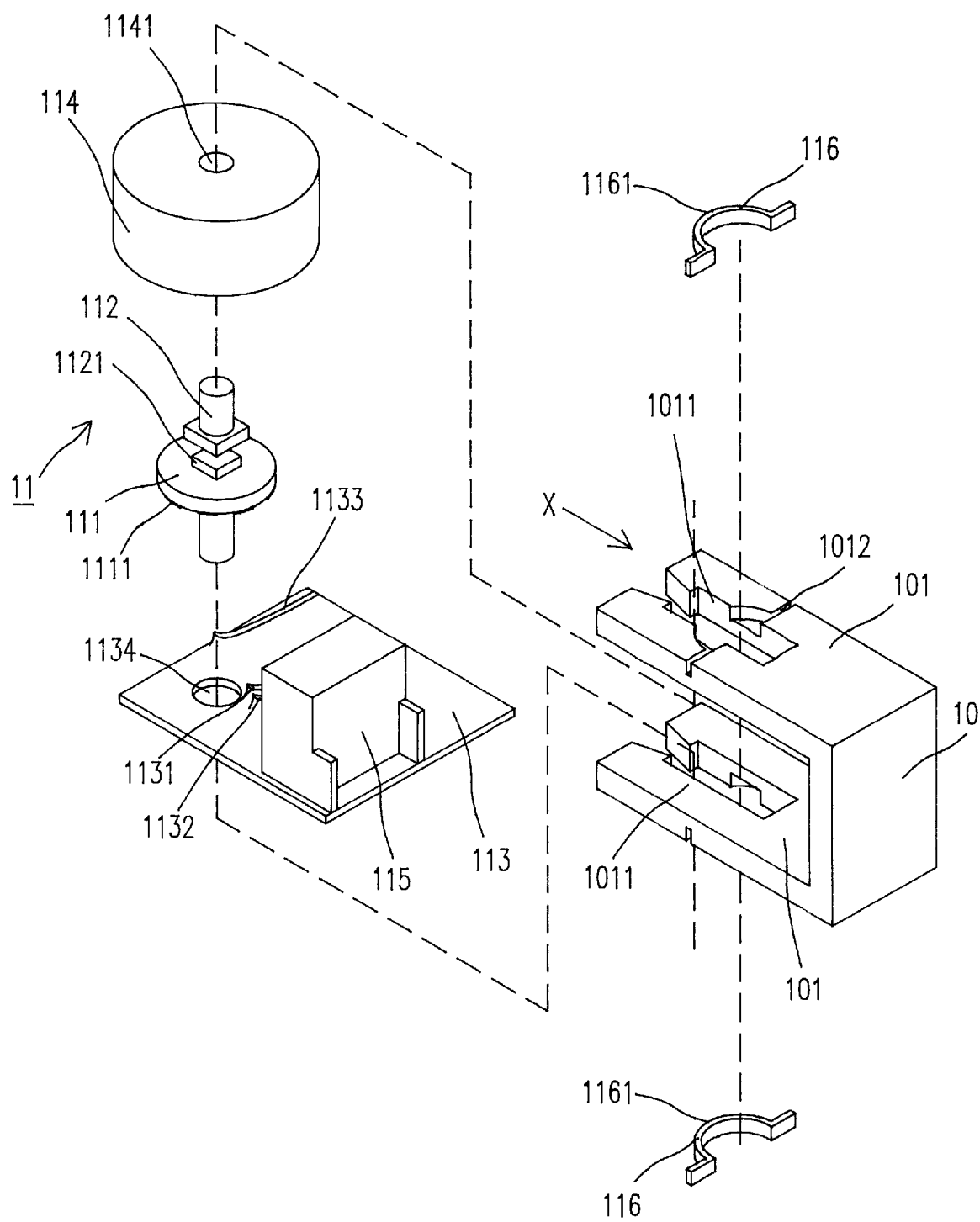
FIG. 1 is an exploded view of a preferred embodiment according to the present invention.

Please refer to FIG. 1, which is all exploded view of a preferred embodiment according to the present invention. The encoder module comprises a positioning base 10 having a pair of corresponding positioning members 101 each having a hole 1011 and a slot 1012 thereon, and a signal generating means 11 mounted between the pair of corresponding positioning members 101 for generating encoding signals. The signal generating means 11 includes a rotating member 111 having a central portion, an axle 112 having a protruding portion 1121 orthogonally mounted thereto and reeving through the central portion of the rotating member 111, a plate 113 having an opening 1134 thereon, an annular member 114 having a central hole 1141, a switch member 115 and a pair of elastic pieces 116. Wherein the rotating member 111 has an electrical contact 1111 on its surface, and there are three electrical brushes 1131, 1132 and 1133 provided on the plate 113.

The present invention is assembled by first mounting the annular member 114 to the axle 112 of the rotating member 111 by pivotly disposing the protruding portion 1121 of the axle 112 in the central hole 1141 of the annular member 114, then connecting the plate 113 to the axle 112 via the opening 1134, and finally reeving the axle 112 through the hole 1011 of each positioning member 101 along the X direction to position the assembled annular member 114, the rotating member 111 and the plate 113 between the pair of corresponding positioning members 101. The rotation of the annular member 114 will cause an intermittent engagement between the electrical brushes 1131, 1132 and 1133 and the electrical contact 1111, respectively. The switch member 115 is installed on the plate 113 adjacent to the annular member 114, and the pair of elastic pieces 116 are respectively located within each slot 1012 of each positioning member 101 and one surface 1161 of each elastic piece 1 16 contacts with the axis 112 respectively.

Figure 2:
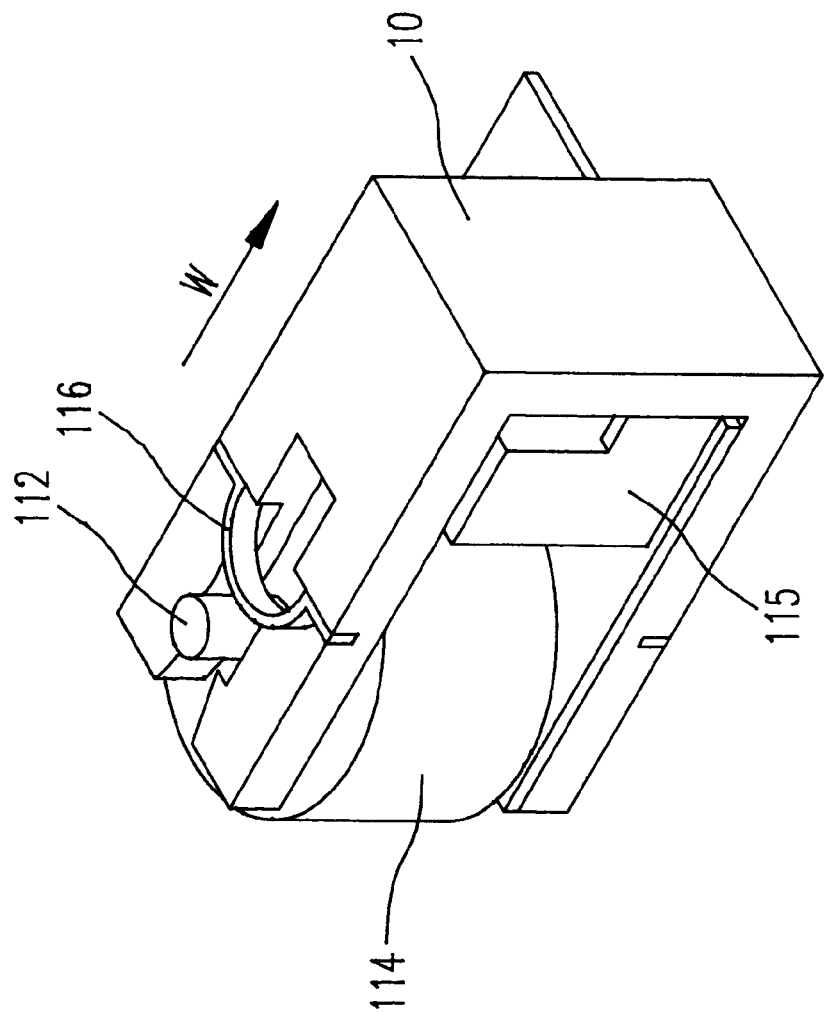
FIG. 2 is an assembly of the preferred encoder module according to the present invention.
Figure 3:
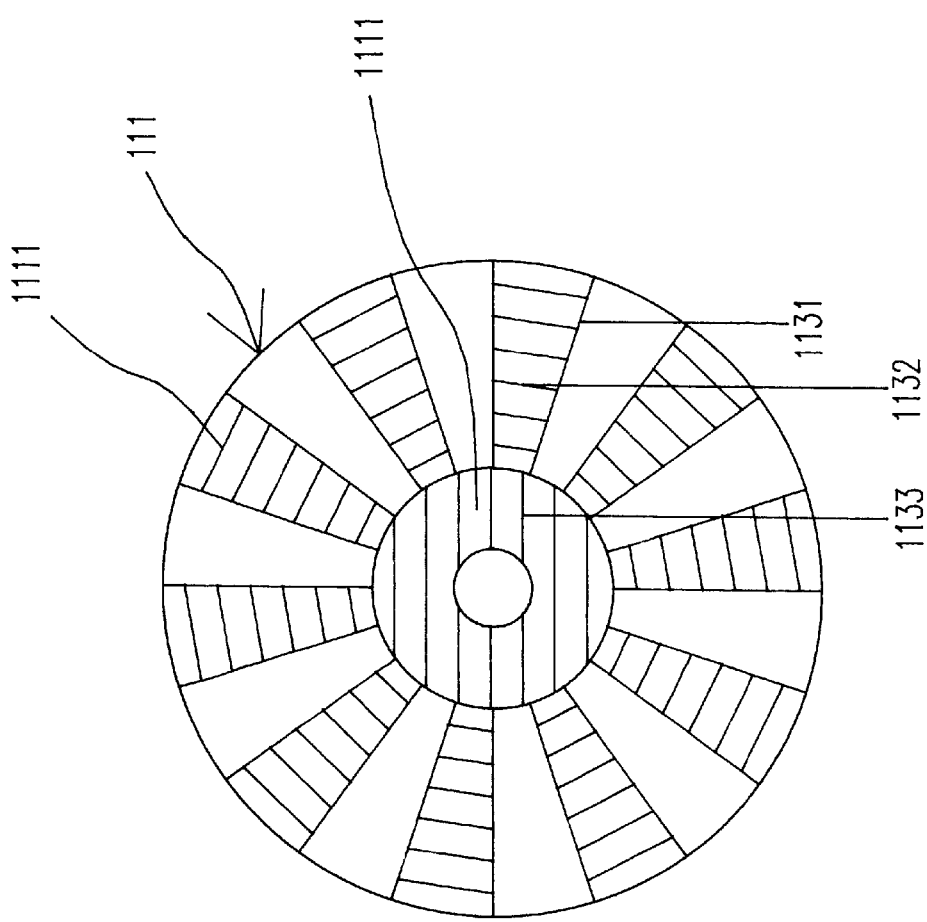
FIG. 3 shows a preferred diagram of the electrical contact and the intermittent engagement between the electrical brushes and the electrical contact of the encoder module according to the present invention.

Please refer to FIG. 2, when using the encoder module of the present invention, the rotating member 111 can be rotated by rotating the annular member 114, while the conductive brushes 1131, 1132 and 1133 are intermittently engaged with the electrical contact 1111 on the rotating member 111, as shown in FIG. 3, which invokes an intermittent close/open status of the electrical brush 1133 to generate encoding signals, e.g. (0, 0), (1, 0), (0, 1), and (1, 1), for controlling the cursor movements. Such encoding signals can be transmitted by wires (not shown) respectively connected to the electrical brushes 1131, 1132 and 1133 to a processing circuit in a computer mouse to generate a cursor control signal. Furthermore, under usual circumstance, one surface 1161 of each elastic piece 116 is respectively engaged with the axle 112 so that the annular member 114 will not contact the switch member 115 due to the bias force of the elastic piece 1116. When the annular member 114 is pressed along the W direction, the switch member 115 will also be pressed to generate an ON/OFF signal, and the annular member 114 will be departed from the swtich member 115 due to a bouncing force of the elastic piece 116. The signal generated by the switch member 115 will also be transmitted to the processing circuit of the computer mouse via the wires.

Figure 4:
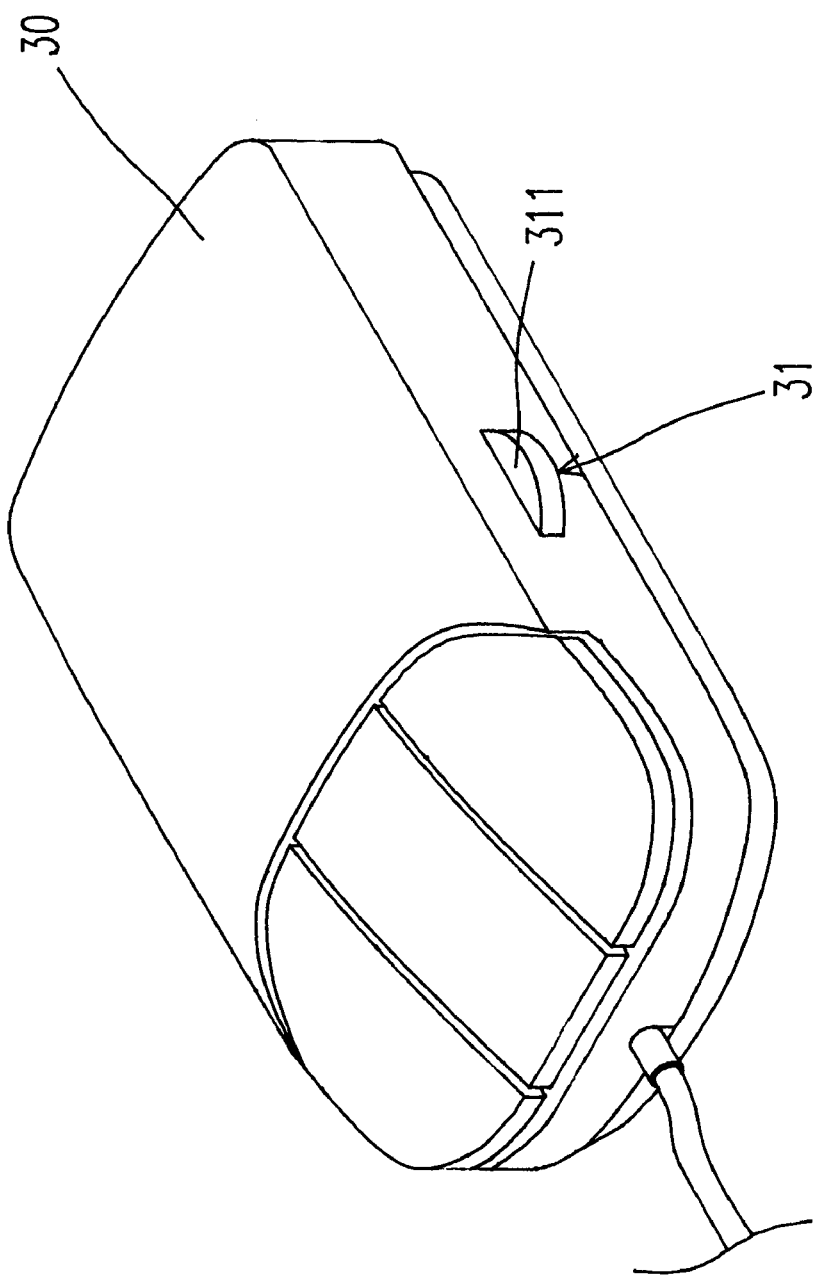
FIG. 4 shows the encoder module being used in a three-dimensional computer mouse according to the present invention.

Referring to FIG. 4 which shows the encoder module being used in a three-dimensional computer mouse according to the present invention. In the preferred embodiment, the encoder module 31 of the present invention can be adapted to be mounted on either a lateral or an upper surface of a computer mouse 30. As shown in FIG. 4, the annular member 114 of the encoder module 31 partially protrudes from the lateral of the computer mouse 30 for being operated thereby.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An encoder module for use in a cursor control device comprising:
    a positioning base having a pair of corresponding positioning members;
    a signal generating means mounted between said pair of corresponding positioning members for generating encoding signals, including:
        a rotating member having an electrical contact on its surface;
        an axle mounted on said rotating member for positioning said rotating member between said pair of corresponding positioning members;
        a plate having a planar surface, said plate being connected perpendicularly to said axle and having a plurality of electrical brushes on said planar surface, said plate being disposed between said pair of positioning members;
        an annular member connected to said axle and arranged to be manually rotated to thereby rotate said rotating member, said annular member and said rotating member sharing a common axis and said annular member, said rotating member and said plate being located between said positioning members;
    a switch member installed on said plate adjacent to said annular member; and
    a pair of elastic pieces respectively provided on each said positioning member and one surface of each said elastic piece respectively contacting said axle,
    wherein said rotating member causes said electrical brushes to intermittently engage said electrical contact, and
    wherein said axle is movable by pushing the annular member so as to cause the annular member to engage said switch member.

2. The encoder module of claim 1 wherein said plurality of electrical brushes include three brushes in which one brush is continuously engaged with and the other two brushes are intermittently engaged with said electrical contact.

3. An encoder module for use in a cursor control device comprising:
    a positioning base having a pair of corresponding positioning members;
    a signal generating means mounted between said pair of corresponding positioning members for generating encoding signals including:
        a rotating member;
        an axle mounted on said rotating member for positioning said rotating member between said pair of corresponding positioning members;
        a plate having a planar surface, said plate being connected perpendicularly to said axle and having a movement detector arranged to detect movement of said rotating member;
    an annular member connected to said axle and arranged to be manually rotated to thereby rotate said rotating member, said annular member and said rotating member sharing a common axis and said annular member, said rotating member and said plate being located between said positioning members;
    a switch member installed on said plate adjacent to said annular member; and
    a pair of elastic pieces respectively provided on each said positioning member and one surface of each said elastic piece respectively contacting said axle, wherein said axle is movable by pushing the annular member so as to cause the annular member to engage said switch member.

* * * * *